(No Model.)

O. SEELY.
WHEEL TIRE.

No. 520,901. Patented June 5, 1894.

Witnesses:
Theo. L. Popp
Chas. F. Burkhardt

O. Seely Inventor
By Wilhelm & Bonner
Attorneys.

THE NATIONAL LITHOGRAPHING COMPANY,
WASHINGTON, D. C.

UNITED STATES PATENT OFFICE.

OBADIAH SEELY, OF SYRACUSE, NEW YORK, ASSIGNOR TO E. C. STEARNS & CO., OF SAME PLACE.

WHEEL-TIRE.

SPECIFICATION forming part of Letters Patent No. 520,901, dated June 5, 1894.

Application filed June 13, 1893. Serial No. 477,442. (No model.)

*To all whom it may concern:*

Be it known that I, OBADIAH SEELY, a citizen of the United States, residing at Syracuse, in the county of Onondaga and State of New York, have invented new and useful Improvements in Tires, of which the following is a specification.

This invention relates to removable pneumatic tires for the wheels of velocipedes and other vehicles, and more especially to that class in which the outer covering is secured to the wheel rim by a split clamping band.

The object of my invention is to provide a simple means for securing the ends of the clamping band in place.

Figure 1:
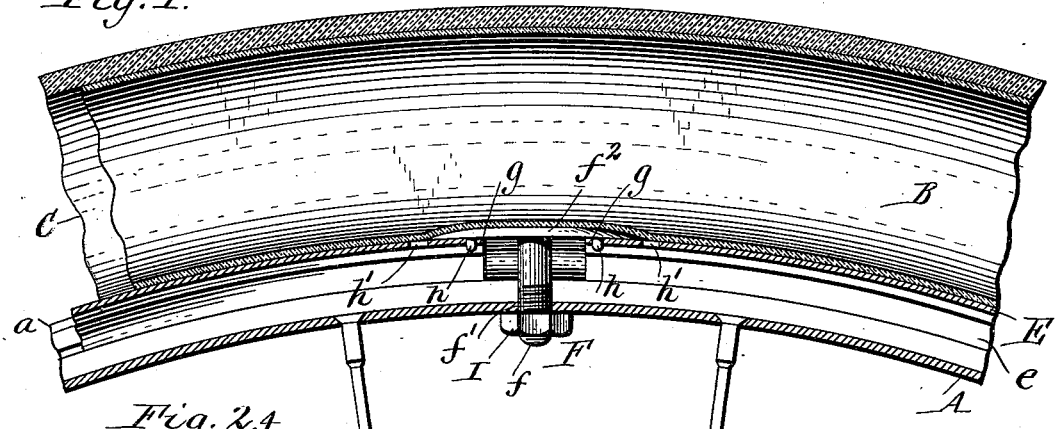
Figure 2:
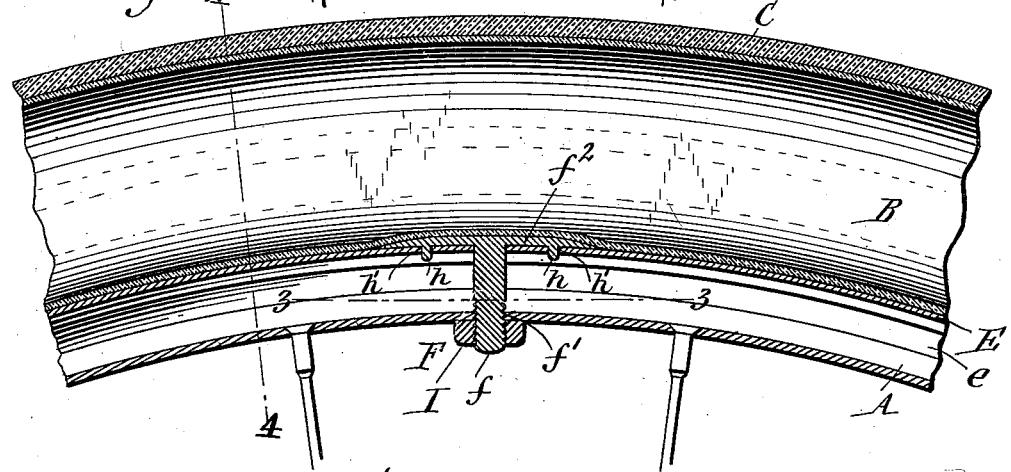
Figure 3:
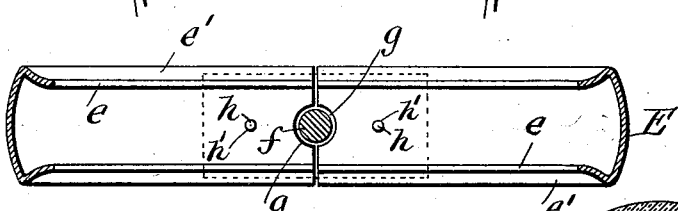
Figure 5:
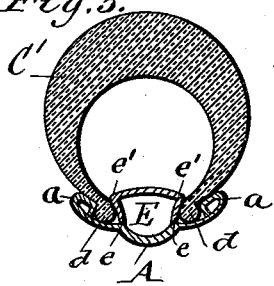
Figure 4:
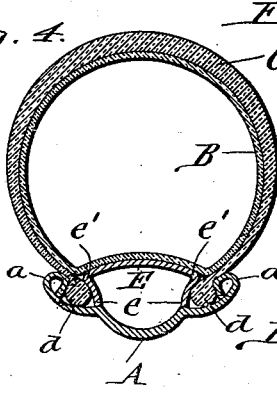
Figure 6:
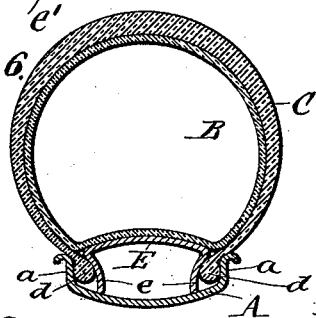

In the accompanying drawings:—Figure 1 is a fragmentary longitudinal section of a velocipede wheel provided with my improvements and showing the clamping band expanded preparatory to placing the covering in position. Fig. 2 is a similar view showing the clamping band contracted and held in its operative position. Fig. 3 is an inside view of the adjacent ends of the clamping band, partly in section, taken in line 3—3, Fig. 2, looking upwardly. Fig. 4 is a transverse section in line 4—4, Fig. 2. Fig. 5 is a similar view, on a reduced scale, showing the clamping band applied to a cushioned tire. Fig. 6 is a cross section showing the side portions of the rim turned outwardly.

Like letters of reference refer to like parts in the several figures.

A represents the rim of the wheel which is provided with outwardly projecting side portions $a$, so that the rim has a channel-shaped cross section with the recess of the channel on the outer side of the rim. The edges of the rim may be stiffened by curling the same inwardly, as represented in Figs. 4 and 5, or by turning them outwardly, as represented in Fig. 6.

B is the air tube which may be of any ordinary construction, and C is the envelope or covering by which the air tube is inclosed in a well known manner. This envelope is substantially horse-shoe shaped in cross section, as shown, and arranged with its open side adjacent to the outside of the wheel rim. The circular edges of the covering are enlarged or thickened, as shown at $d$, and rest against the outer side of the rim, and against the inner sides of its side portions.

E represents a split or divided clamping band whereby the covering is clamped against the rim, and which is arranged between the edges of the covering. This clamping band is preferably provided at both circular edges with inwardly extending flanges $e$, which converge inwardly or toward the middle of the rim, so as to form overhanging portions $e'$ on the band, which bear against the inner sides of the enlarged edges of the covering. When the clamping band is contracted its flanges rest with their edges against the rim. The clamping band is preferably made of spring metal, so that its ends will spring together when released.

F represents a clamping bolt whereby the ends of the clamping band are secured together and held against the edges of the covering and against the rim. The shank $f$ of this bolt is arranged radially between the ends of the clamping band and passes with its inner screw threaded end through an opening $f'$ in the rim. The head $f^2$ of the clamping bolt is flattened or elongated in the peripheral direction of the tire and is arranged on the outer side of the clamping band and overlaps both ends thereof. In order to permit the ends of the clamping band to approach each other sufficiently close, the ends of the clamping band are provided with semi-circular notches $g$, which receive the bolt, as represented in Figs. 2 and 3. The under side of the head of the clamping bolt is provided with two depending pins or projections $h$ which are arranged on opposite sides of the shank, and engage in openings $h'$ formed in the end portions of the clamping band, thereby preventing the latter from expanding.

I represents a screw nut applied to the screw threaded end of the clamping bolt, and bearing against the inner side of the rim, whereby the head of the clamping bolt is drawn against the clamping band, and the pins $h$ are held in the openings thereof.

When it is desired to open the envelope for obtaining access to the inclosed air tube to make repairs, the air tube is deflated or allowed to collapse. The screw nut of the clamping bolt is then loosened, and the latter is moved outwardly until the pins on its head are disengaged from the openings in the clamping band. One edge of the covering is then withdrawn from between the rib of the rim and the clamping band, whereby access is afforded to the air tube.

In assembling the parts of the tire, the clamping band is first expanded and placed around the rim and is held in this expanded position by engaging the pins of the clamping bolt between the ends of the clamping band in the notches thereof, as represented in Fig. 1. The air tube is now placed around the clamping band in a deflated condition. The covering is next placed around the air tube and its thickened edges are inserted between the side portions of the rim and the overhanging flanges of the clamping band. The clamping bolt is now pushed outward sufficiently to disengage its pins from the ends of the clamping band, when the latter, owing to its resilience, springs together with its ends, whereby the band is contracted and caused to bear against the inner sides of the thickened edges of the covering. When the clamping band has been sufficiently contracted, the openings in its ends are in line with the pins of the clamping bolt, so that, upon tightening the screw nut of the bolt, the pins enter the openings in the band and prevent the latter from expanding.

When the clamping band has been contracted and bears against the edges of the covering, the flanges of the clamping band rest against the outer side of the rim. The space between each flange of the clamping band and the adjacent side portion of the rim becomes narrower outwardly, so that the thickened edge portion of the covering, which is confined in the space, cannot be withdrawn, whether the tube is inflated or not, unless the clamping band is released. The flanges of the clamping band are of such height, that, when they rest upon the rim, the outer side of the clamping band is slightly beyond the outer edges of the side portions of the rim, thereby forming a firm support for the covering and air tube when they collapse, owing to a puncture in the air tube or other cause. The head of the clamping bolt is nearly as wide as the clamping band in order to prevent the air tube from entering in the joint between the ends of the band and being injured. This clamping band may be used for securing a cushioned tire C' to a wheel rim, as represented in Fig. 5, in which case the flanges of the band bear against the thickened edges of the tire in the same manner in which they bear against the thickened edges of the covering in the construction hereinbefore described.

While I prefer a clamping band provided with side flanges as described and shown, I do not wish to limit myself to this construction.

I claim as my invention—

1. The combination with the rim and the covering, of a clamping band divided transversely and having its ends separated, and a clamping bolt arranged between the separated ends of the clamping band and having a head which bridges the space between said ends and overlaps the latter, substantially as set forth.

2. The combination with the rim and the covering, of a divided clamping band which clamps the covering against the rim and which is provided with openings at its ends, and a clamping bolt having a head provided with projections which engage in said openings, substantially as set forth.

3. The combination with the rim and the covering, of a divided clamping band which clamps the covering against the rim and which is provided in its ends with notches and with openings adjacent to said notches, a clamping bolt arranged between the ends of the clamping band and passing through the rim, and having a head arranged on the outer side of the clamping band and provided with pins engaging in said openings, and a screw nut applied to the inner end of the shank and bearing against the inner side of the rim, substantially as set forth.

Witness my hand this 26th day of May, 1893.

OBADIAH SEELY.

Witnesses:
 H. W. WELLS,
 GEO. MURRAY, Jr.